(12) United States Patent
Itsumi

(10) Patent No.: US 7,755,691 B2
(45) Date of Patent: Jul. 13, 2010

(54) DRIVING METHOD FOR SOLID-STATE IMAGE PICKUP DEVICE AND IMAGE PICKUP APPARATUS

(75) Inventor: Kazutaka Itsumi, Kuwana (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 898 days.

(21) Appl. No.: 11/604,344

(22) Filed: Nov. 27, 2006

(65) Prior Publication Data
US 2007/0120992 A1 May 31, 2007

(30) Foreign Application Priority Data
Nov. 30, 2005 (JP) ............... 2005-346561

(51) Int. Cl.
H04N 5/335 (2006.01)
H04N 3/14 (2006.01)

(52) U.S. Cl. .............. 348/311; 348/294; 348/324
(58) Field of Classification Search ............. 348/317, 348/316, 319
See application file for complete search history.

(56) References Cited
U.S. PATENT DOCUMENTS
5,008,758 A 4/1991 Burke
5,325,412 A 6/1994 Stekelenburg
2007/0002164 A1* 1/2007 Ward et al. ............ 348/362

\* cited by examiner

Primary Examiner—David L Ometz
Assistant Examiner—Antoinette T Spinks
(74) Attorney, Agent, or Firm—Oliff & Berridge, PLC (57) ABSTRACT

Screen noise caused by variations of dark current between light sensitive pixels of a solid-state imaging device are suppressed. In an exposure period E after an electronic shutter operation completion time t2, information charges are accumulated while shifting a potential well. With a frame-transfer CCD image sensor in which transfer electrodes G1-G3 to which transfer clocks $\phi i1$-$\phi i3$ are applied are provided for each light sensitive pixel, at the start of the exposure period E, a potential well is formed for a period $\alpha$ under the electrode G2. Then, the potential wells are formed sequentially under the electrode G1 for a period $2\alpha$, under the electrode G2 for a period $\alpha$, and under the electrode G3 for a period $2\alpha$. That is, regarding dark current contained in the information charges accumulated in each pixel, dark currents under the electrodes G1-G3 correspond to the same period. Thus, the amounts of dark current accumulated in each pixel become position-wise averaged values within the pixel and variations in the dark current between the pixels are reduced.

8 Claims, 7 Drawing Sheets

FIG. 1

( related art )

DRIVING METHOD FOR SOLID-STATE IMAGE PICKUP DEVICE AND IMAGE PICKUP APPARATUS

CROSS-REFERENCE TO RELATED APPLICATION

The priority application number JP2005-346561 upon which this patent application is based is hereby incorporated by the reference.

FIELD OF THE INVENTION

The present invention relates to a solid-state imaging device for producing information charges as a result of receiving light using a CCD shift register, and more particularly, to reduction of screen noise due to dark current.

BACKGROUND OF THE INVENTION

Frame transfer CCD solid-state imaging devices comprise an imaging section which produces and stores information charges for each pixel as a result of exposure, and a storage section which is light-shielded and holds the information charges transferred at a high speed from the imaging section until the information charges are read out on a single line basis by a horizontal transfer section.

Each of the imaging section and the storage section has vertical CCD registers comprising a plurality of charge-transfer channel regions extended vertically parallel to each other and a plurality of transfer electrodes extended horizontally parallel to each other. Each bit of the CCD shift register includes a plurality of transfer electrodes which are disposed adjacently, and forms at each charge-transfer channel region one potential well for storing information charges as a result of voltage applied to the transfer electrodes. Each bit of the CCD shift register is assigned to a pixel of the imaging device.

Conventional driving circuits form a potential well, which is secured at a fixed location during an exposure period, at each bit of the CCD shift register of the imaging section and causes information charges corresponding to an incident ray volume to be stored in the potential well. That is, ON-voltage is applied to a particular transfer electrode corresponding to a clock of a certain phase among a plurality of transfer electrodes, which are driven by clocks having mutually displaced phases, of each bit, whereby a potential well is formed under the particular transfer electrode.

Figure 1:
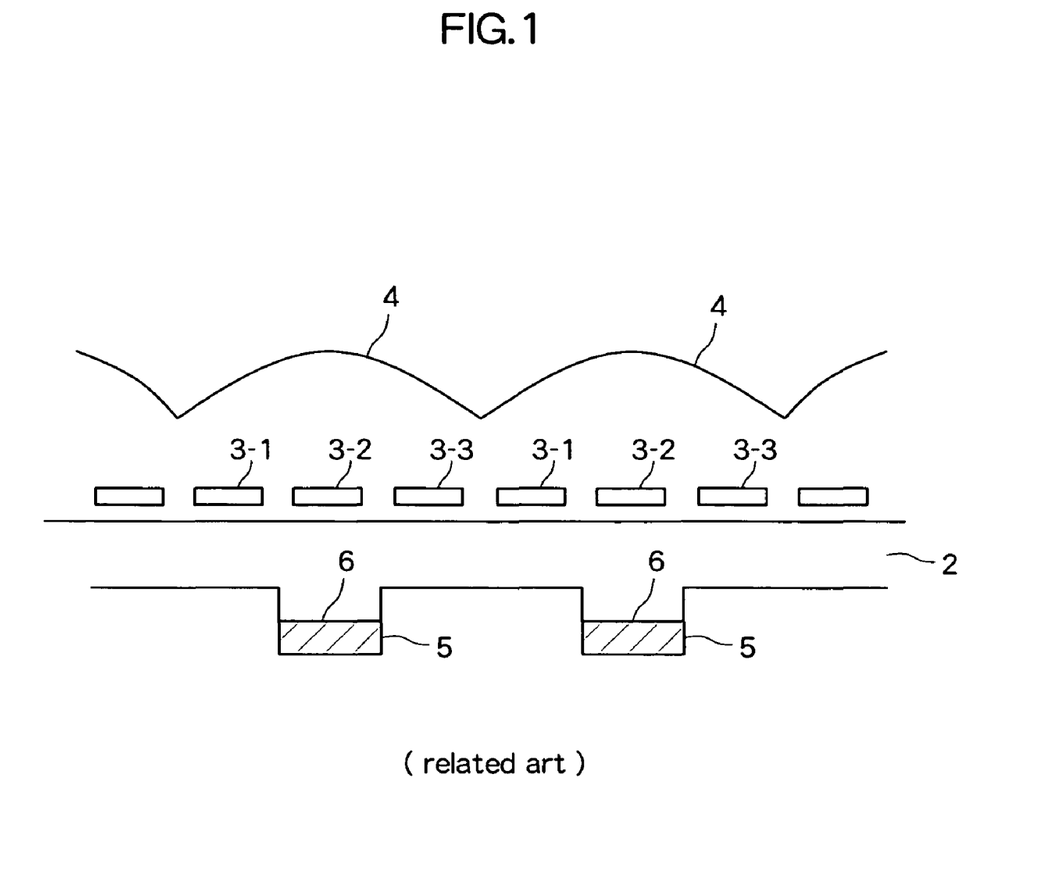
FIG. 1 schematically shows a potential well during an exposure period according to a conventional driving method when an imaging section comprises a CCD shift register constituted in a three-phase drive.

FIG. 1 schematically shows a potential well during an exposure period according to a conventional driving method when an imaging section comprises a CCD shift register constituted in a three-phase drive. Transfer electrodes 3-1, 3-2 and 3-3 to which clock pulses $\phi i1$, $\phi i2$ and $\phi i3$ are respectively applied are periodically disposed on a charge-transfer channel region 2. One set of the continuously-arranged transfer electrodes 3-1 to 3-3 is assigned to one pixel. FIG. 1 shows lenses 4 which constitute a microlens array. Each lens 4 is disposed on three transfer electrodes 3-1 to 3-3 assigned to a single pixel. During an exposure period, for example, ON-voltage is applied to the transfer electrode 3-2 at the center of the pixel corresponding to the center of the lens, while OFF-voltage is applied to the other transfer electrodes 3-1 and 3-3, as a result of which a potential well 5 is formed under the transfer electrode 3-2 and information charges 6 produced by incident light are stored in the potential well 5.

In the charge-transfer region 2, for example, a dark current occurs due to the effect of an interface state in the vicinity of a surface of a semiconductor substrate. The potential well 5 formed during the exposure period stores not only information charges 6 produced in correspondence with an incident ray but also a dark current generated at a corresponding region. This dark current may deteriorate an S/N ratio. The extent to which dark current is generated depends on uncontrollable factors, such as the interface state, and may fluctuate from place to place in the charge transfer channel region. With conventional driving methods, a dark current component contained in information charges of each pixel is the dark current component generated at the location where the potential well is formed, i.e. the location under the transfer electrode to which the ON-voltage is applied. Since each potential well is formed so as to be spaced two transfer electrodes width from each adjacent potential well, the amount of dark current contained in each potential well is relatively susceptible to the position-dependent variations of the amounts of generated dark current. In other words, the conventional art suffers from a problem where noise on a screen, due to the variations in the amount of dark current component between pixels, tends to become larger, which increases granularity of an image and gives a visual impression that the image appears rough.

SUMMARY OF THE INVENTION

The present invention provides a driving method for a solid-state imaging device and an image pickup apparatus with a preferable image having reduced granularity noise.

According to the present invention, there is provided a driving method for a solid-state imaging device, the imaging device being provided with a CCD shift register as an imaging section for forming potential wells, respectively corresponding to a plurality of pixels, using a plurality of transfer electrodes arranged on a charge transfer channel region, and accumulating information charges generated by exposure in the potential wells, the method comprising a shifting accumulation step in which an ON-electrode for forming the potential well in each pixel is changed within an exposure period among the plurality of transfer electrodes positioned at the pixel, and as the potential well shifts, the accumulation position to which the information charges are accumulated is shifted within the pixel.

An image pickup apparatus of the invention comprises a solid-state imaging device, provided with a CCD shift register as an imaging section for forming potential wells respectively corresponding to a plurality of pixels using a plurality of transfer electrodes arranged on a charge transfer channel region and storing information charges generated by exposure in the potential wells, and a driving circuit for driving the solid state imaging device, wherein the driving circuit performs a shifting accumulation operation in which an ON-electrode for applying ON-voltage to each pixel is changed among the plurality of transfer electrodes positioned at the pixel, and as the potential well formed by the application of the ON-voltage shifts, the accumulation position to which the information charges are accumulated is shifted within the pixel.

DESCRIPTION OF THE PREFERRED EMBODIMENT

Hereinafter, preferred embodiments of the present invention will be described with reference to the accompanying drawings.

Figure 2:
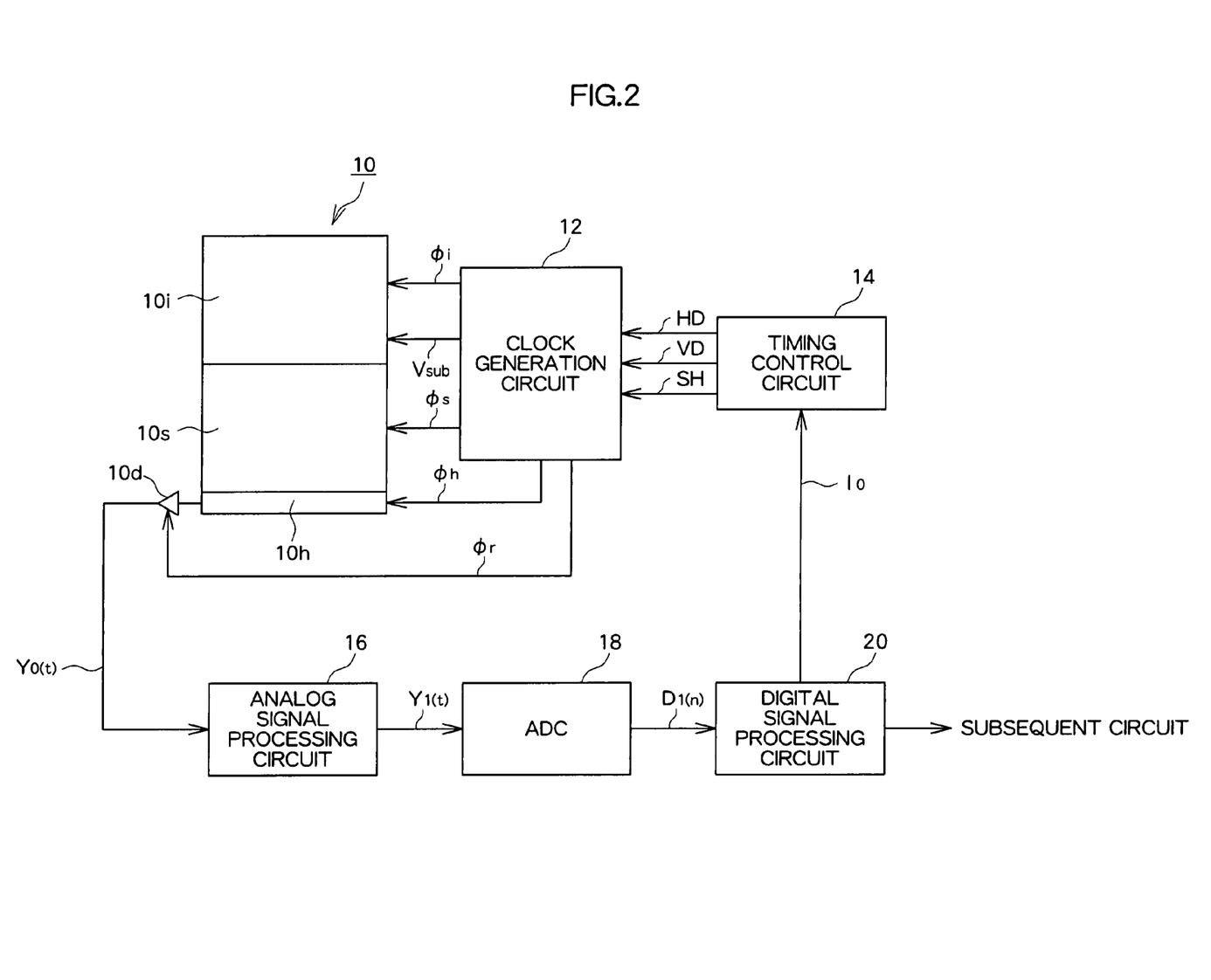
FIG. 2 is a block diagram schematically illustrating a structure of an image pickup apparatus according to an embodiment of the invention.

FIG. 2 is a block diagram schematically illustrating a structure of an image pickup apparatus according to an embodiment of the invention. This image pickup apparatus comprises an image sensor 10, a clock generation circuit 12, a timing control circuit 14, an analog signal processing circuit 16, an A/D converting circuit 18, and a digital signal processing circuit 20.

The image sensor 10 is a frame transfer CCD image sensor and includes an imaging section 10i, a storage section 10s, a horizontal transfer section 10h and an output section 10d, all formed on a surface of a semiconductor substrate. Each of the imaging section 10i and the storage section 10s has a plurality of vertical CCD shift registers arranged in a line direction (a horizontal direction of an image). Each of the vertical CCD shift registers of the imaging section 10i and each of the vertical CCD shift registers of the storage section 10s are arranged in a column direction and have a consecutive channel. The vertical CCD shift register includes a plurality of gate electrodes as transfer electrodes. The gate electrodes extend in the line direction and are arranged in the column direction on the substrate. By applying clocks having mutually displaced phases, which are out of phase with each other, to the transfer electrodes, the information charges for each pixel are transferred vertically through the vertical CCD shift register. In this image sensor 10, the CCD shift registers of the imaging section 10i and storage section 10s are driven according to a three-phase drive. The imaging section 10i is supplied with a three-phase clock φi and the storage section 10s is supplied with a three-phase clock φs, whereby storage and transfer of the information charges are respectively controlled.

Light-sensitive pixels, each constituted by a single bit of the vertical CCD shift register of the imaging section 10i, generate and accumulate signal charges according to the incident light. The accumulation of the information charges at the imaging section 10i will be described in detail later.

When a predetermined exposure period is over, the vertical CCD shift register of the imaging section 10i and the vertical CCD shift register of the storage section 10s are respectively driven by the three-phase clocks φi and φs, and frame transfer from the imaging section 10i to the storage section 10s is carried out. The storage section 10s is covered with a light-shielding film and generation of charges due to the incidence of light can be prevented. Therefore, the signal charges frame-transferred from the imaging section 10i can be held as they are. The horizontal transfer section 10h is formed by a CCD shift register, and the bits of the horizontal transfer section are correspondingly connected to the outputs of the vertical CCD shift registers of the storage section 10s. The signal charges for one screen held in the storage section 10s are transferred on a single line basis to the horizontal transfer section 10h by a line transfer operation. The signal charges transferred to the horizontal transfer section 10h are then transferred to the output section 10d by the horizontal transfer operation of the horizontal transfer section 10h. The output section 10d consists of an electrically isolated capacitor and an amplifier for extracting a potential change thereof, wherein the signal charges output from the horizontal transfer section 10h are received on a bit basis, converted to voltage values and output as time-series image signals Y0(t).

The clock generation circuit 12 generates a clock φi for driving the vertical shift register of the imaging section 10i, a clock φs for driving the vertical shift register of the storage section 10s, a clock φh for driving the horizontal transfer section 10h, a clock φr for driving a reset gate of the output section 10d and a substrate voltage Vsub to be applied to an n-type semiconductor substrate, thereby driving the image sensor 10. The clock generation circuit 12 operates according to timing signals supplied from the timing control circuit 14.

The timing control circuit 14 comprises a plurality of counters, each for counting a reference clock CK with a constant cycle, and dividing a reference clock CK to generate timing signals such as a horizontal synchronizing signal HD and a vertical synchronizing signal VD.

The analog signal processing circuit 16 performs processes such as automatic gain control (AGC) or sample and hold with respect to the image signal Y0(t), and generates an image signal Y1(t) in a predetermined format.

The analog-to-digital converter (ADC) 18 converts the analog image signal Y1(t) output from the analog signal processing circuit 16 into a digital value, and outputs digital signals as image data D1(n).

The digital signal processing circuit 20 is supplied with the image data D1(n) from the ADC 18 and performs various kinds of processing. For example, the digital signal processing circuit 20 generates brightness data or color data from the image data D1(n), and also performs contour correction, gamma correction, etc. on the generated data. Further, the digital signal processing circuit 20 comprises an automatic exposure control circuit for integrating image data in one screen unit, and controlling expansion and contraction of an exposure time E on the basis of this integrated value. For example, the automatic exposure control circuit assigns an exposure control value Io with a horizontal scanning period (1H) as a unit as an exposure period E.

Figure 3:
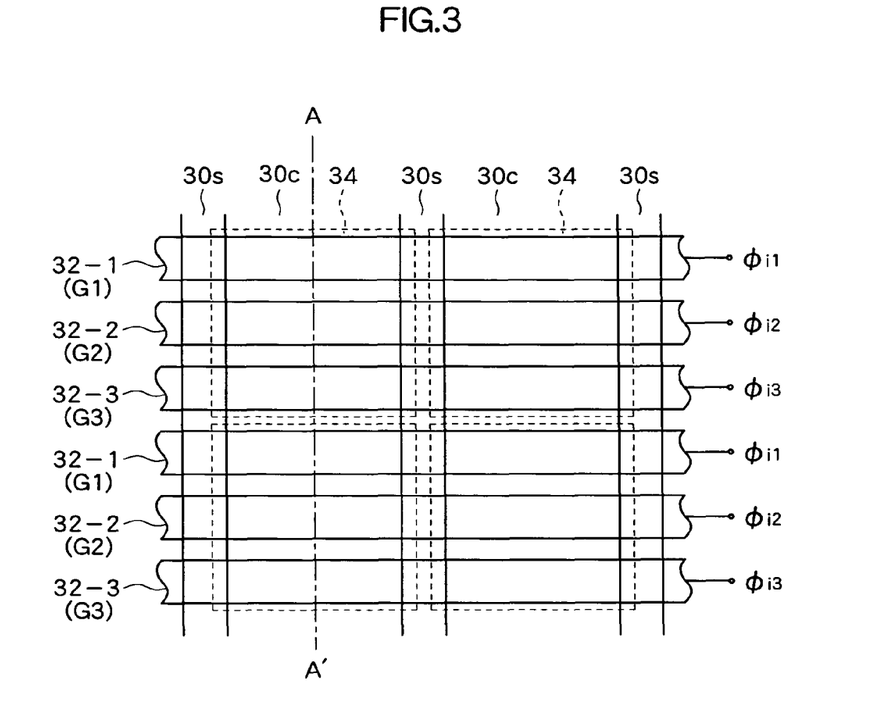
FIG. 3 is a schematic plan view showing a part of an imaging section.

FIG. 3 is a schematic plan view showing a part of the imaging section 10i. Each light-sensitive pixel corresponds to a bit of a vertical shift register, and can accumulate information charges for one pixel. Each adjacent pair of channel regions 30c in the vertical shift register are separated from each other by a channel stop region 30s. The transfer electrodes G1 to G3 (transfer electrodes 32-1 to 32-3) are periodically arranged in a column direction on the channel regions 30c each extending in the column direction. Each group of transfer electrodes 32-1 to 32-3 is disposed on each light-sensitive pixel 34. Here, the transfer electrode 32-2 is disposed at the center of the pixel. The clocks φi1 to φi3 from the clock generation circuit 12 are respectively applied to the transfer electrodes 32-1 to 32-3.

Figure 4:
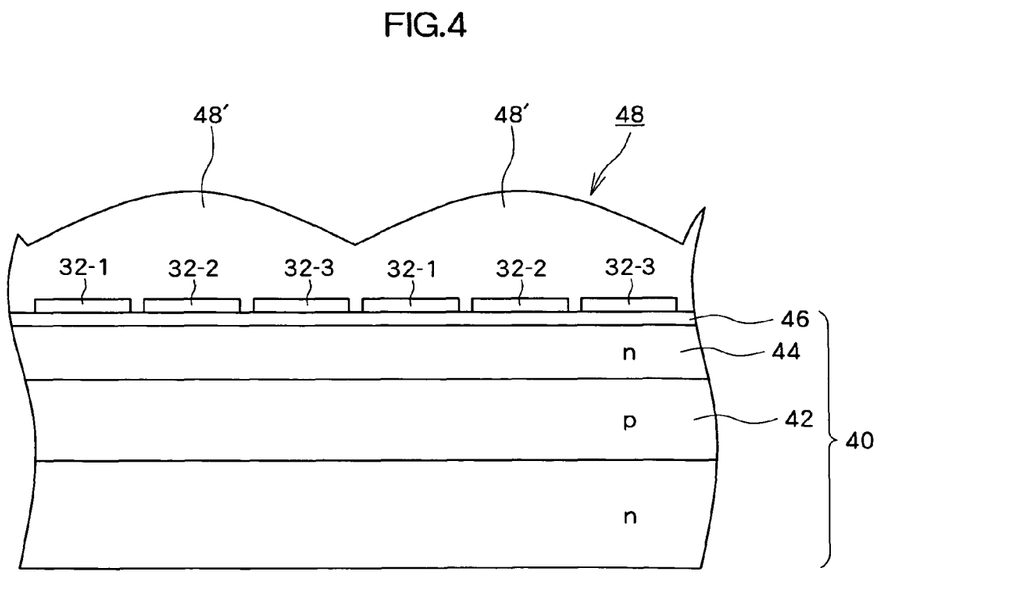
FIG. 4 is a schematic sectional view of a CCD shift register of the imaging section taken along the charge transfer direction.

FIG. 4 is a schematic sectional view of a CCD shift register of the imaging section 10i taken along the charge transfer direction and shows a vertical section taken along line A-A' of FIG. 3. For example, an n-type semiconductor substrate 40 is used. A p-well 42 is formed by diffusing p-type impurities in an n-type semiconductor substrate 40. Meanwhile, an n-well 44 is formed by diffusing n-type impurities in the n-type semiconductor substrate 40 to a depth of diffusion smaller than that of the p-well 42, making the CCD shift register a buried channel CCD. Further, the n-well 44 and the p-well 42 form an npn structure in the depth direction in the semiconductor substrate 40. The transfer electrodes 32-1 to 32-3 are periodically arranged in a column direction with a gate oxide film 46 being interposed therebetween. As described above, the transfer electrodes 32-1 to 32-3 are respectively supplied with the three-phase clocks $\phi i1$ to $\phi i3$. The channel potential within the semiconductor substrate under the gate oxide film 46 is controlled by the clock voltages. FIG. 4 also shows a microlens array 48. Respective lenses 48' which constitute the microlens array 48 are arranged in correspondence with light sensitive pixels and focus the light incident upon each lens 48' so as to irradiate the corresponding light sensitive pixel.

Figure 5:
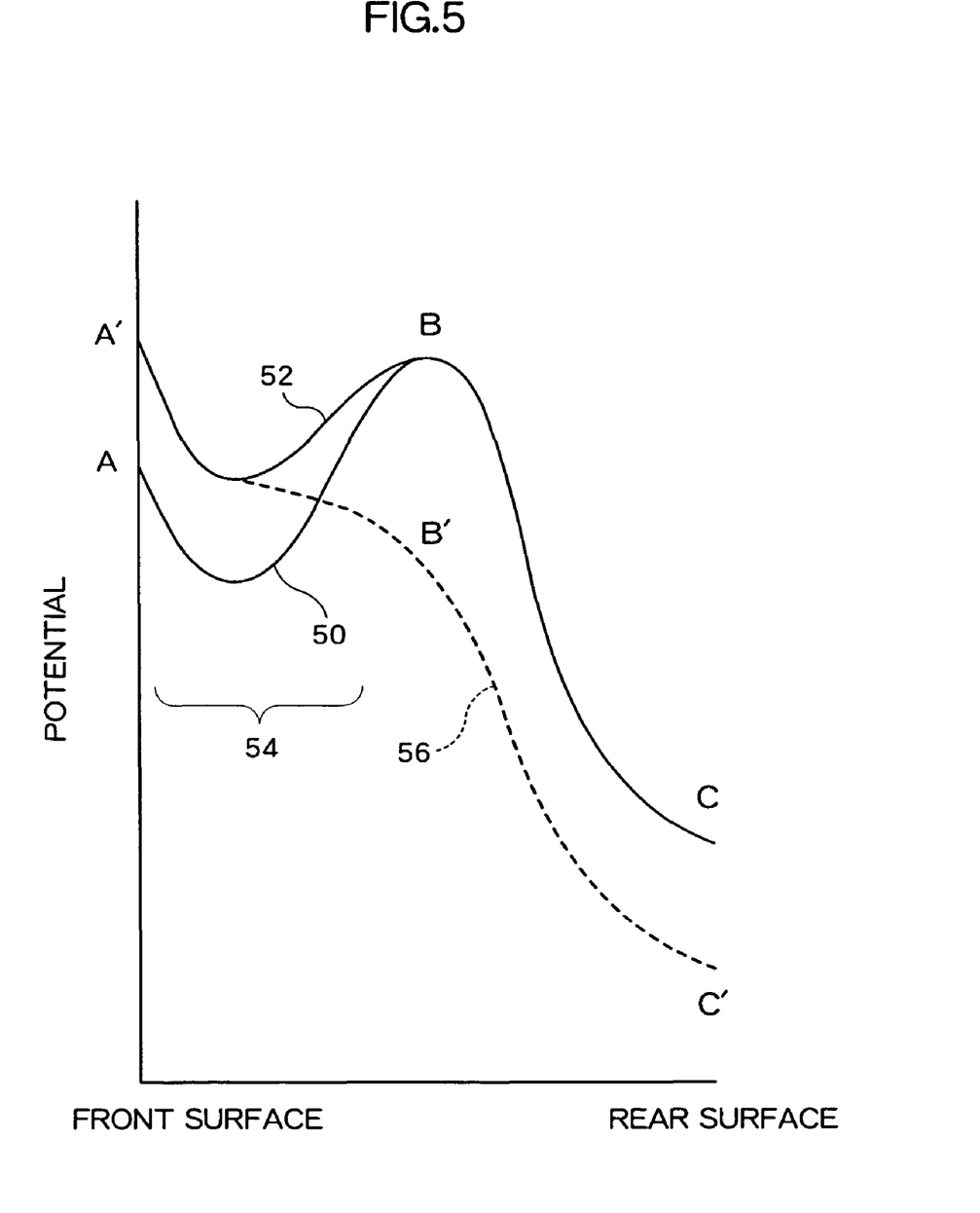
FIG. 5 is a schematic view illustrating a potential profile in a depth direction of a substrate of the CCD shift register shown in section in FIG. 4.

FIG. 5 is a schematic view illustrating a potential profile in a depth direction of a substrate of the CCD shift register shown in section in FIG. 4. In FIG. 5, the horizontal axis indicates the depth measured from the surface of the semiconductor substrate. The vertical axis represents potential. The downward direction denotes the positive potential direction, and the upward direction denotes the negative potential direction. A curve 50 (curve ABC) shows a potential profile when applying ON-voltage of a transfer clock (a predetermined positive voltage) to the transfer electrode 32, and a curve 14 (curve A'BC) shows a potential profile when applying OFF-voltage of the transfer clock (a predetermined negative voltage) to the transfer electrode 32. When applying the ON-voltage to the transfer electrode, a potential well is formed in an area 54 close to the surface of the semiconductor substrate and thus electrons can be stored in the potential well. On the other hand, when applying the OFF-voltage to the transfer electrode, a potential barrier is formed in the area close to the surface of the semiconductor substrate and thus the potential wells are separated.

Further, the OFF-voltage is set to a voltage for pinning the potential of the substrate surface under the transfer electrode to which the OFF-voltage is applied. An inversion layer, in which holes supplied from the channel stop region 30s are accumulated, is provided on the surface of the semiconductor substrate in the pinned state. Under the condition inverted by the holes as just described, generation of thermally excited electrons in an interface region in contact with the gate oxide film is suppressed. Since the density of free holes in a valence band at the inverted interface is great, the rate at which the interface state produced at the interface between the substrate and the gate oxide film captures the holes becomes higher. Therefore, electrons excited to the interface state from the valance band are prone to capture a hole and return to the valance band. Accordingly, under the transfer electrode to which the OFF-voltage is applied, electrons become difficult to excite to the conduction band. As a result, the dark current via the interface state can be suppressed.

In FIG. 5, a curve 56 shown by the dotted line (curve A'B'C') represents a potential profile for an electronic shutter operation. In the electronic shutter operation, the OFF-voltage is applied to the transfer electrode and the substrate voltage Vsub is increased to a positive voltage higher than that of the normal condition. When Vsub is increased, the potential of the p-well at usual point B deepens to point B', which can eliminate a potential barrier caused by the p-well in the substrate depth direction. This enables discharge of information charges on the front side of the substrate to the back side of the substrate beyond the p-well 42.

Figure 6:
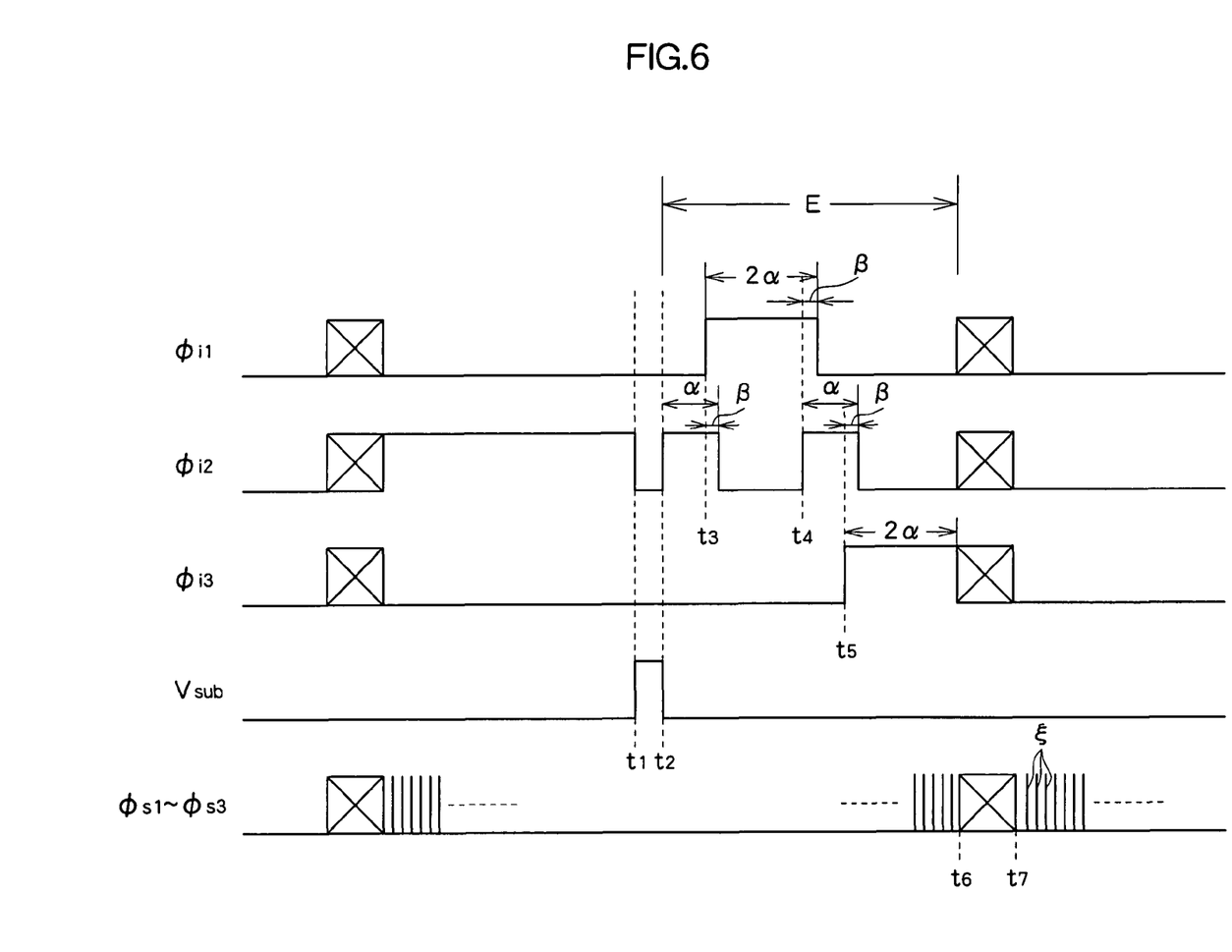
FIG. 6 is a schematic timing diagram showing basic shifts in various voltage signals supplied to an image sensor by a clock generation circuit.
Figure 7:
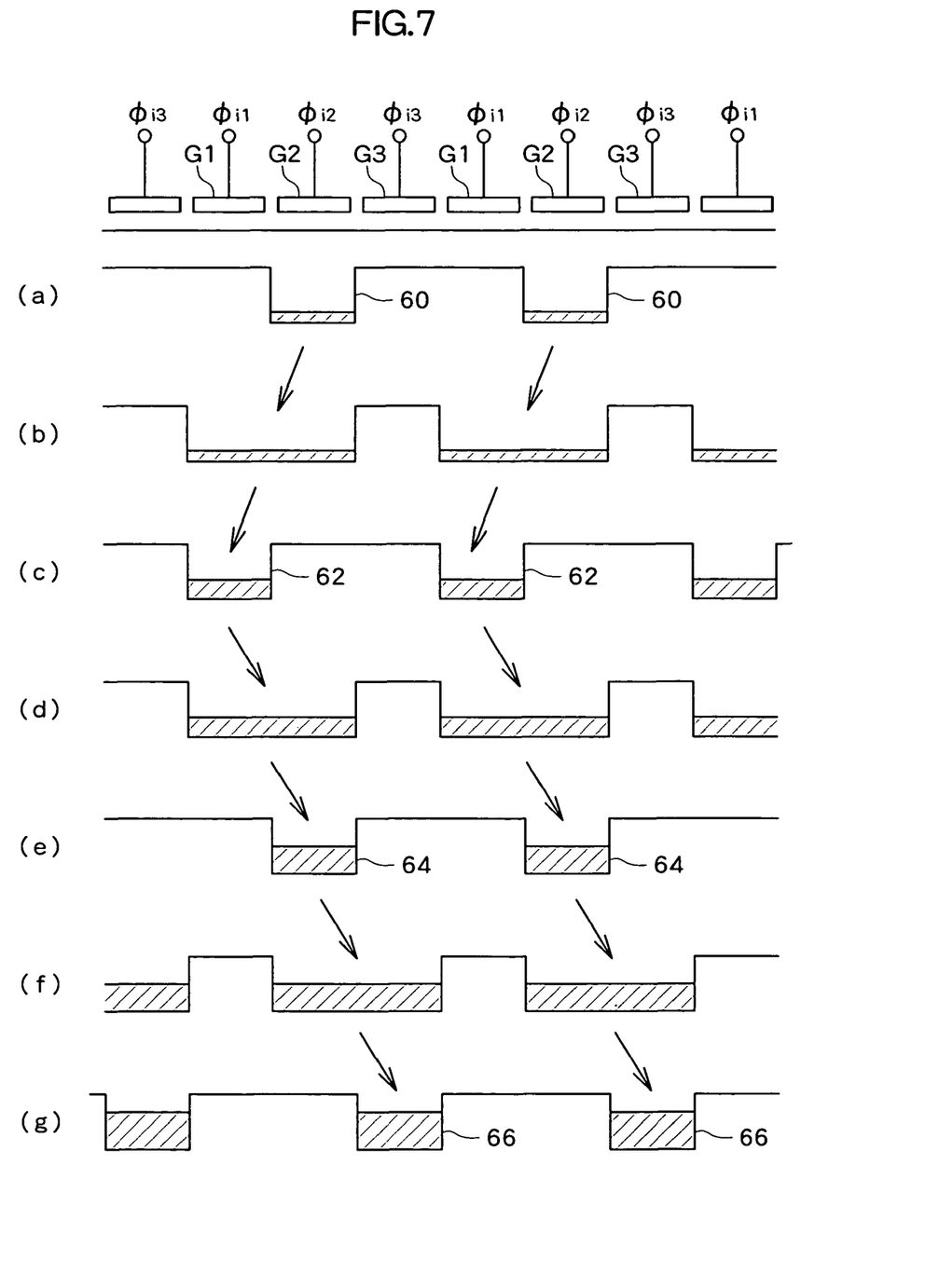
FIG. 7 is a schematic view showing a potential well formed in the imaging section during an exposure period E.

Description will next be given of a method for driving an image sensor of the image pickup apparatus. FIG. 6 is a schematic timing diagram showing basic shifts in various voltage signals supplied to the image sensor 10 by a clock generation circuit 12. FIG. 6 shows schematic waveforms of transfer clock signals $\phi i1$-$\phi i3$ to be applied to the transfer electrodes of the imaging section 10i, a schematic waveform of the substrate voltage signal Vsub, and timing for generation of transfer clocks $\phi s$ to be applied to the transfer electrodes of the storage section 10s. In FIG. 6, the horizontal axis represents time. Further, regarding the vertical axis of each waveform shown in FIG. 6, an upper direction is a direction of increasing voltage. FIG. 7 is a schematic view showing a potential well formed in the imaging section 10i during an exposure period E.

When photographing one image, first the imaging section 10i is subjected to exposure. The exposure period E is controlled by the electronic shutter operation. In the electronic shutter operation, the clock voltages $\phi i1$-$\phi i3$ to be applied to the transfer electrodes G1-G3 disposed at the imaging section 10i are all turned to the OFF-voltage during a predetermined period (period t1 to t2), and the substrate voltage Vsub is made higher than its normal condition. As a result, the information charges accumulated at the channel region of the imaging section 10i are discharged to the back side of the substrate.

At a time t2 when the electronic shutter operation completes, a clock signal, for example $\phi i2$, of a predetermined phase of $\phi i$ is turned to the ON-state, and a potential well 60 is formed under the corresponding transfer electrode of the imaging section 10i (see the state (a) in FIG. 7). The exposure period E starts from this point in time. On the other hand, the end of the exposure period E is defined by the frame transfer start time t6.

According to the present image pickup apparatus, the position of the potential well is shifted within a pixel during the exposure period E. During each exposure period, potential wells are formed respectively during the same time period under the three transfer electrodes G1-G3 positioned at each pixel. Specifically, the clock generation circuit 12 keeps the transfer clock $\phi i2$ at the ON-voltage during a time period $\alpha$ from the time t2. As a result, a potential well 60 is formed under the transfer electrode G2 and information charges corresponding to the time period $\alpha$ are accumulated (the state (a) in FIG. 7). Then, the transfer clock $\phi i1$ is put to the ON-voltage for a time period $2\alpha$ from the time t3 preceding the end of the ON-voltage of $\phi i2$ by a predetermined period $\beta$. As a result, the information charges stored under G2 move to a potential well 62 newly formed under the transfer electrode G1, and information charges generated under the transfer electrode G1 are further accumulated in the potential well 62 during a period $2\alpha$ (the states (b) and (c) in FIG. 7). Then, the transfer clock $\phi i2$ is again set to the ON-voltage for a time period $\alpha$ from the time t4 preceding the end of the ON-voltage of $\phi i1$ by a predetermined period $\beta$. As a result, the information charges stored under the transfer electrode G1 move to a potential well 64 newly formed under the transfer electrode G2, and information charges generated under the transfer electrode G2 are further accumulated in the potential well 64 during a period $\alpha$ (the states (d) and (e) in FIG. 7). Further, the transfer clock $\phi i3$ is set to the ON-voltage for a time period $2\alpha$ from the time t5 preceding the end of the ON-voltage of $\phi i2$ by a predetermined period $\beta$ to a frame transfer start time t6. As a result, the information charges stored under the transfer electrode G2 move to a potential well 66 newly formed under the transfer electrode G3, and information charges generated under the transfer electrode G3 are further accumulated in the potential well 65 during a period 2α (the states (f) and (g) in FIG. 7). The information charges stored in the potential well 66 under the transfer electrode G3 are transferred at a high speed to the storage section 10s by frame transfer started at the time t6.

Through the steps mentioned above, the period during which a potential well is formed under each transfer electrode G1 to G3 during the exposure period E is 2α. Thus, regarding dark current contained in the information charges of each pixel transferred to the storage section 10s, the amounts of the dark currents accumulated under the respective electrodes G1-G3 are the same in response to accumulation periods equal to each other. As a result, the dark currents at various positions in a pixel are averaged and variations of the dark current components between pixels are suppressed.

Specifically, in frame transfer, the clock generation circuit 12 generates high-speed clocks, which are synchronized with each other as transfer clocks φi (φi1-φi3) and φs (φs1-φs3), of cycles corresponding to the number of pixels arranged in the column direction of the image section 10i. Accordingly, the signal charges of all pixels of the imaging section 10i are all transferred in a short time to the storage section 10s having a light-shielding film. The information charges transferred to the storage section 10s are then transferred to the output section 10d by a line transfer operation and a horizontal transfer operation by the horizontal transfer section 10h. The output section 10d converts the information charges to image signals Y0(t) and sequentially outputs the image signals Y0(t). The clock generation circuit 12 generates a transfer clocks φs of a single cycle and performs the line transfer operation at each time ξ synchronized with a horizontal synchronization signal HD generated by the timing control circuit 14.

As described above, the automatic exposure control circuit controls expansion and contraction of the exposure period E on the basis of the integral value of the image data of a preceding frame. The timing control circuit 14 elongates or shortens the aforementioned period α, which defines the presence time of the potential well at each transfer electrode G1-G3, in accordance with an exposure control value Io from the automatic exposure control circuit.

Figure 8:
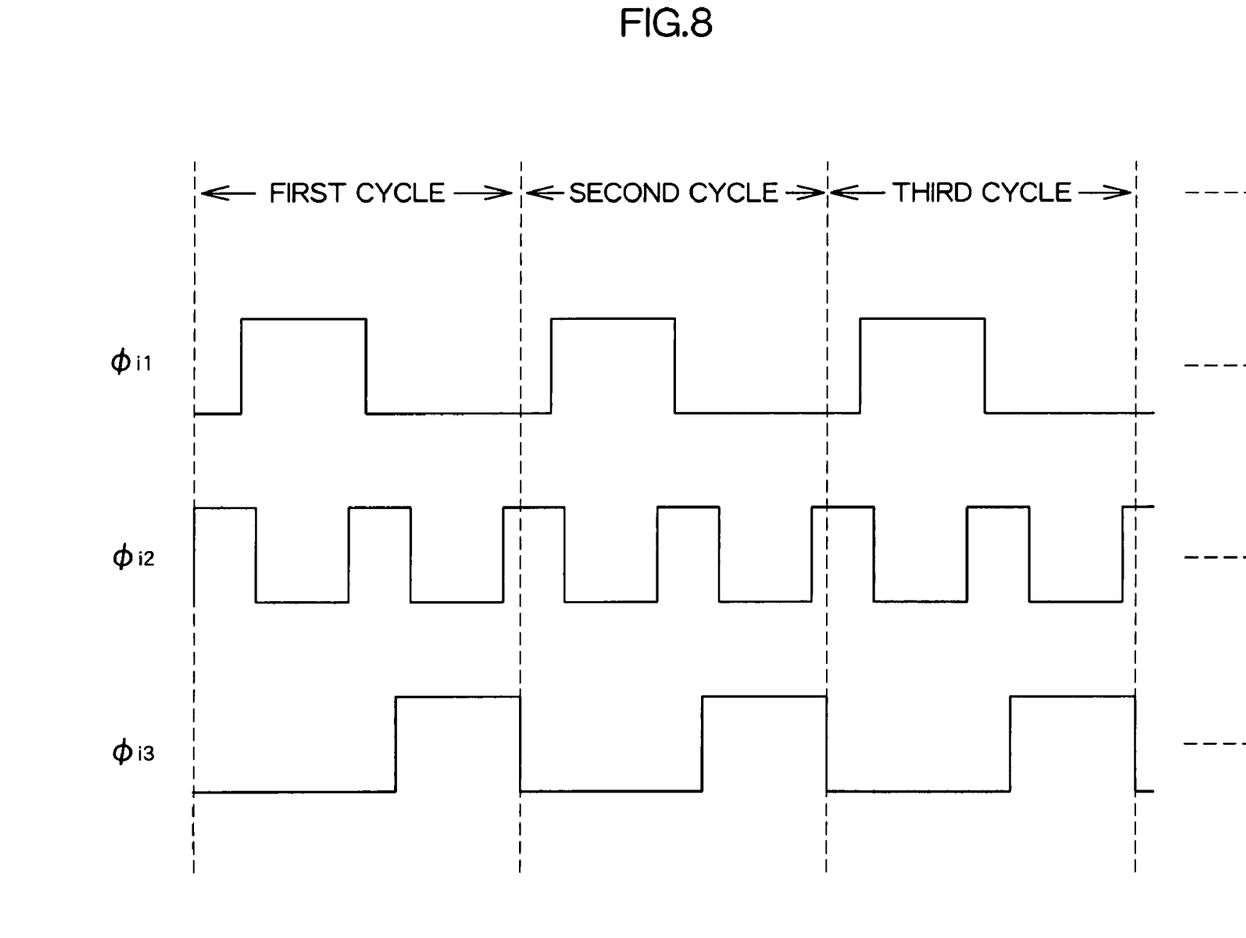
FIG. 8 is a timing diagram of transfer clocks φi for explaining positional shifting of a potential well.

Further, the timing control circuit 14 determines the number of times that the potential well is shifted so that the time period for which the potential well formed under one transfer electrode is continuously present does not exceed an upper limit τmax. FIG. 8 is a timing diagram of transfer clocks φi for explaining positional shifting of a potential well. In FIG. 8, the horizontal axis is a time axis. Further, in FIG. 8, the upper voltage state of each waveform represents the ON-voltage and the lower voltage state of each waveform represents the OFF-voltage. ON-periods of the transfer clocks φi1-φi3 correspond to the transfer electrodes under which a potential well is formed. The shifting of a potential well in the operation example in FIG. 6 corresponds to a first cycle of φi shown in FIG. 8. To increase the times of shifting of the potential well, the timing control circuit 14 increases the times of change of φi1-φi3 on the basis of the cycle unit shown in FIG. 8. In this operation, the duration of the potential wells formed under the transfer electrodes G1 and G3 are respectively 2α, which is longer than the duration of the potential well formed under the transfer electrode G2. Accordingly, the timing control circuit 14 selects the minimum number of cycles such that none of the durations of the potential wells under the transfer electrodes G1 and G3 exceed the upper limit τmax. Further, the timing control circuit 14 elongates and shortens the period α such that the clock operation period of the selected number of cycles φi matches the exposure period E. For example, the timing control circuit 14 can define the period α by the count number of the reference clocks CK. Further, since the exposure period E is controlled based on the exposure control value Io as described above, the timing control circuit 14 can be constituted such that the cycle number is determined depending on the exposure control value Io. The cycle number and the period α may be determined by arithmetic processing by the timing control circuit 14 or may be determined by previously storing in a table the cycle number and the count number of the reference clock CK representing the period α in relation to the exposure control value Io, and then retrieving the table.

Referring to FIG. 8, the exposure period E when the cycle number is K can be easily understood as follows:

$$E=6k\alpha-(4k-1)\beta \quad (1)$$

The restriction of the duration of the potential well is given as follows:

$$2\alpha \leq \tau max \quad (2)$$

From these expressions, E'(k) which is an upper limit of E in relation to k is represented by the following equation:

$$E'(k)=3k\tau max-(4k-1)\beta \quad (3)$$

For E which satisfies the following expression, the cycle number is defined as n.

$$E'(n-1)<E\leq E'(n) \quad (4)$$

When the cycle number is determined as n, α is determined by the following equation:

$$\alpha=\{E+(4n-1)\beta\}/6n \quad (5)$$

Thus, by setting the upper limit of the duration α of the potential well under each transfer electrode, information charges are accumulated during the period when the interface state is kept at the condition having holes in the inversion layer when the OFF-voltage is applied and, as a result, the dark current can be suppressed. The longer the duration of the potential well, the higher the rate at which the holes at the interface state are captured by electrons, and the higher the rate at which electrons are excited to the conduction band via the interface state. As a result, the dark current gradually increases until a stationary state where the application of OFF-voltage no longer has an effect. In view of suppressing the dark current, it is preferable to set the upper limit τmas depending on a transient period where the OFF-voltage application still has an effect.

Further, in the aforementioned embodiment, the potential well shifts over three transfer electrodes G1-G3 positioned at a pixel. However, for another embodiment where the potential well moves over two adjacent transfer electrodes, for example, G1 and G2, or G2 and G3, the dark current reduction effect and screen granularity noise reduction effect can be expected.

Further, according to the aforementioned embodiment, a shifting and accumulation operation wherein the potential well is shifted and information charges are accumulated is performed regardless of the length of the exposure period E. However, it is also possible to select whether or not shift of the potential well is performed depending on the length of the exposure period E. In case the exposure period E is under a predetermined reference value such as under a high illumination environment, the potential well may be fixed under a predetermined transfer electrode without shifting during the exposure period E such that information charges are accumulated therein (stationary accumulation operation). On the other hand, when illumination is reduced and the exposure period is increased to exceed the predetermined reference value, the aforementioned shifting accumulation operation may be carried out. For example, in the stationary accumulation operation, the potential well is fixed under the transfer electrode G2 near the center of the lens 48' in the three-phase drive imaging section 10i mentioned above. When the exposure period E is short, the amount of dark current components contained in information charges is small, and the granularity noise or the like caused by the variations of the dark current between pixels is negligible. Thus, in such a case, the imaging operation can be simplified while employing the stationary accumulation operation.

As described above, a driving method for a solid-state imaging device according to the present invention relates to driving a solid-state imaging device, provided with a CCD shift register as an imaging section for forming potential wells respectively corresponding to a plurality of pixels using a plurality of transfer electrodes arranged on a charge transfer channel region, and accumulating information charges generated by exposure in the potential wells. The driving method of the invention comprises a shifting accumulation step in which an ON-electrode for forming the potential well in each pixel is changed within an exposure period among the plurality of transfer electrodes positioned at the pixel, and as the potential well shifts, the accumulation position to which the information charges are accumulated is shifted within the pixel. This reduces variations of the dark current contained into the information charges between pixels.

In the aforementioned driving method, a stationary accumulation step in which the transfer electrode used as the ON-electrode is fixed during the exposure period may be performed when the exposure period does not exceed a predetermined reference value, and the shifting accumulation step may be performed when the exposure period exceeds the predetermined reference value. As a result, in the case of a long exposure period wherein the dark current components contained into the information charges may increase, variations of dark current between pixels can be suppressed.

In the shifting accumulation step, accumulation periods in the exposure period, during which the information charges are accumulated under the respective transfer electrodes for each pixel, may be equal to each other. As a result, variations of dark current can be preferably suppressed.

Further, in the shifting accumulation step, the number of shifts of the accumulation position of the information charges can be increased or decreased depending on the length of the exposure period. As a result, it becomes possible to reduce the dark current contained in the information charges against the dark current generation mechanism wherein the dark current generation gradually increases after formation of a potential well. From this point of view, the number of shifts corresponding to a given exposure period can be set such that each of the durations of accumulating the information charges under the respective transfer electrodes does not exceed a predetermined upper limit. Further, the upper limit can be determined depending on a transient period from a time when the voltage applied to the transfer electrode is switched from an OFF-voltage to an ON-voltage to a time when a dark current generation amount under the transfer electrode reaches a stationary state.

For the aforementioned driving method when the CCD shift register has a charge transfer channel of an embedded channel structure, the dark current components contained in the information charges accumulated in each pixel can be reduced by applying a pinning voltage, which makes a surface of a semiconductor substrate in the charge transfer channel region a pinned state, to an OFF-electrode, which is provided for forming a potential barrier against the potential well, among the plurality of transfer electrodes for each pixel.

As described above, an image pickup apparatus according to the present invention relates to an image pickup apparatus, comprising: a solid-state imaging device, provided with a CCD shift register as an imaging section for forming potential wells respectively corresponding to a plurality of pixels using a plurality of transfer electrodes arranged on a charge transfer channel region and storing information charges generated by exposure in the potential wells; and a driving circuit for driving the solid state imaging device. In the image pickup apparatus of the invention, wherein the driving circuit performs a shifting accumulation operation in which an ON-electrode for applying ON-voltage to each pixel is changed among the plurality of transfer electrodes positioned at the pixel, and as the potential well formed by the application of the ON-voltage shifts, the accumulation position to which the information charges are accumulated is shifted within the pixel.

In the driving circuit, a stationary accumulation operation wherein a transfer electrode for forming the potential well among the plurality of transfer electrodes for each pixel is fixed during the exposure period may be performed when the exposure period does not exceed a predetermined reference value, and the shifting accumulation operation may be performed when the exposure period exceeds the predetermined reference value.

In the shifting accumulation operation, accumulation periods in the exposure period, during which the information charges are accumulated under the respective transfer electrodes for each pixel, may be set equal to each other.

According to the invention, dark current components at different positions within a pixel are accumulated by shifting the potential well within a pixel during the exposure period. Thus, the amounts of dark current accumulated in each pixel become position-wise averaged values within the pixel. As a result, the variations of the dark current components between the pixels are suppressed, thereby reducing the granularity noise in an image.

What is claimed is:

1. A driving method for a solid-state imaging device, provided with a CCD shift register as an imaging section for forming potential wells respectively corresponding to a plurality of pixels by a plurality of transfer electrodes arranged on a charge transfer channel region, and accumulating information charges generated by exposure in the potential wells, the method comprising:

a shifting accumulation step in which an ON-electrode for forming the potential well in each pixel is changed within an exposure period among the plurality of transfer electrodes positioned at the pixel, and as the potential well shifts, an accumulation position to which the information charges are accumulated is shifted within the pixel; and a stationary accumulation step in which the transfer electrode used as the ON-electrode is fixed during the exposure period, wherein the shifting accumulation step is performed when the exposure period exceeds a predetermined reference value, and the stationary accumulation step is performed when the exposure period does not exceed the predetermined reference value.

2. The driving method according to claim 1, wherein the shifting accumulation step sets accumulation periods in the exposure period, during which the information charges are accumulated under the respective transfer electrodes positioned at each pixel, equal to each other.

3. The driving method according to claim 1, wherein the shifting accumulation step increases or decreases number of shifts of the accumulation position of the information charges depending on the length of the exposure period.

4. The driving method according to claim 3, wherein number of shifts corresponding to the given exposure period can be set such that each of durations of accumulating the information charges under the respective transfer electrodes does not exceed a predetermined upper limit.

5. The driving method according to claim 4, wherein the upper limit is determined depending on a transient period from a time when a voltage applied to the transfer electrode is switched from OFF-voltage to ON-voltage to a time when a dark current generation amount under the transfer electrode reaches a stationary state.

6. The driving method according to claim 1,
wherein the CCD shift register is a solid-state imaging device having a charge transfer channel of an embedded channel structure; and wherein
a pinning voltage, which makes a surface of a semiconductor substrate in the charge transfer channel region a pinned state, is applied to an OFF-electrode for forming a potential barrier against the potential well among the plurality of transfer electrodes positioned at each pixel.

7. An image pickup apparatus, comprising:
a solid-state imaging device, provided with a CCD shift register as an imaging section for forming potential wells respectively corresponding to a plurality of pixels using a plurality of transfer electrodes arranged on a charge transfer channel region and accumulating information charges generated by exposure in the potential wells; and
a driving circuit for driving the solid state imaging device, wherein the driving circuit performs
a shifting accumulation operation, when the exposure period exceeds a predetermined reference value, in which the ON-electrode for applying On-voltage to each pixel is changed within an exposure period among the plurality of transfer electrodes positioned at the pixel, and as the potential well formed by the application of the ON-voltage shifts, the accumulation position to which the information charges are accumulated is shifted within the pixel, and
a stationary accumulation operation, when the exposure period does not exceed the predetermined reference value, in which the transfer electrode used as the ON-electrode is fixed during the exposure period.

8. The image pickup apparatus according to claim 7, wherein the shifting accumulation operation sets accumulation periods in the exposure period, during which the information charges are accumulated under the respective transfer electrodes positioned at each pixel, equal to each other.

* * * * *